(12) United States Patent
Zygmant et al.

(10) Patent No.: US 9,778,655 B2
(45) Date of Patent: *Oct. 3, 2017

(54) UNMANNED VEHICLE OPERATING MODES

(71) Applicant: Sikorsky Aircraft Corporation, Stratford, CT (US)

(72) Inventors: Thomas Zygmant, Southport, CT (US); Jesse J. Lesperance, Harvest, AL (US); Ira E. Zoock, Orange, CT (US); James A. Kelly, Middlebury, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/248,215

(22) Filed: Aug. 26, 2016

(65) Prior Publication Data

US 2016/0363934 A1 Dec. 15, 2016

Related U.S. Application Data

(63) Continuation of application No. 14/725,567, filed on May 29, 2015, now Pat. No. 9,499,264.

(60) Provisional application No. 62/005,460, filed on May 30, 2014.

(51) Int. Cl.
*G05D 1/00* (2006.01)
*B64C 39/02* (2006.01)
*G08G 5/00* (2006.01)

(52) U.S. Cl.
CPC ......... *G05D 1/0061* (2013.01); *B64C 39/024* (2013.01); *G05D 1/0055* (2013.01); *G05D 1/0088* (2013.01); *G08G 5/003* (2013.01); *B64C 2201/141* (2013.01); *B64C 2201/146* (2013.01); *G05D 2201/02* (2013.01)

(58) Field of Classification Search
CPC ............ G05D 1/0061; G05D 2201/02; G05D 1/0083; G05D 1/0088; G08G 5/003; B64C 39/024; B64C 2201/141; B64C 2201/146

See application file for complete search history.

(56) References Cited

U.S. PATENT DOCUMENTS

| | | |
|---|---|---|
| D418,805 S | 1/2000 | Cycon |
| 6,527,225 B1 | 3/2003 | Silder, Jr. |
| 6,694,228 B2 | 2/2004 | Rios |
| 7,195,200 B2 | 3/2007 | Yamane |
| 8,229,163 B2 | 7/2012 | Coleman |
| 8,231,085 B2 | 7/2012 | Cherepinsky |
| 8,515,609 B2 | 8/2013 | McAndrew |
| 8,543,265 B2 | 9/2013 | Ekhaguere |
| 2004/0075018 A1* | 4/2004 | Yamane .................. B64C 13/20 244/17.13 |
| 2007/0244608 A1 | 10/2007 | Rath |

(Continued)

*Primary Examiner* — Yuen Wong
(74) *Attorney, Agent, or Firm* — Cantor Colburn LLP

(57) ABSTRACT

An aircraft is provided and includes a frame, drive elements configured to drive movements of the frame and a computer configured to receive mission planning and manual commands and to control operations of the drive elements to operate in a safe mode in which mission commands are accepted but manual commands are refused, a manual mode in which mission commands are refused but manual commands are accepted and an enroute mode. The computer is further configured to only allow mode transitions between the safe and manual modes and between the safe and enroute modes.

9 Claims, 3 Drawing Sheets

(56) References Cited

U.S. PATENT DOCUMENTS

2011/0035149 A1\* 2/2011 McAndrew .......... G05D 1/0038
   701/466
2014/0249693 A1 9/2014 Stark \* cited by examiner

* 1ˢᵗ special mode

** 2ⁿᵈ special mode

UNMANNED VEHICLE OPERATING MODES

CROSS REFERENCE TO RELATED APPLICATION

This application is a Continuation Application of U.S. patent application Ser. No. 14/725,567, which was filed on May 29, 2015 and which claims priority to U.S. Provisional Application No. 62/005,460 that was filed on May 30, 2014. The entire contents of U.S. patent application Ser. No. 14/725,567 and U.S. Provisional Patent Application No. 62/005,460 are incorporated herein by reference.

BACKGROUND OF THE INVENTION

The subject matter disclosed herein relates to an unmanned vehicle and, more particularly, to an unmanned vehicle having operating modes.

Unmanned vehicles are aircraft or other ground-based vehicles that are autonomously controlled or remotely piloted. In most cases, the unmanned vehicle has a mission that includes travel to a sequence of waypoints from which the vehicle may continue to subsequent waypoints or execute some aspect of its mission. The mission data can be uploaded to the unmanned vehicle during grounded conditions or during in-flight operations.

In the case of unmanned aerial vehicles, a mission may include a combination of ground operations and aerial operations but mission data may be uploaded and changed during both types of operations. This can lead to a situation in which mission data is uploaded to the unmanned aerial vehicle and, during the upload, the unmanned aerial vehicle is undesirably maneuvered either by accident or mistake. Such maneuvers can lead to a crash or to the unmanned aerial vehicle deviating from its course.

BRIEF DESCRIPTION OF THE INVENTION

According to one aspect of the invention a vehicle is provided and includes a frame, drive elements configured to drive movements of the frame and a computer configured to receive mission planning and manual commands and to control operations of the drive elements to operate in a safe mode in which mission commands are accepted but manual commands are refused, a manual mode in which mission commands are refused but manual commands are accepted and an enroute mode. The computer is further configured to only allow mode transitions between the safe and manual modes and between the safe and enroute modes.

In accordance with embodiments or, as an alternative, the frame is manned, unmanned, or manned but un-crewed.

In accordance with embodiments or, as an alternative, the mission commands include mission details, on-board system details and/or waypoint settings and the manual commands include local maneuvering commands.

In accordance with embodiments or, as an alternative, the safe mode includes a stationary mode characterized in that the frame is stationary relative to ground and the manual mode includes a manual mode characterized in that the frame is movable relative to the ground.

In accordance with embodiments or, as an alternative, the computer executes the mission commands during the enroute mode.

In accordance with embodiments or, as an alternative, the computer is receptive of a stop command, which initiates a transition from the manual mode to the safe mode and from the enroute mode to the safe mode.

According to another aspect of the invention, an aircraft is provided and includes an airframe, drive elements configured to drive movements of the airframe and a computer configured to receive flight planning and manual commands and to control operations of the drive elements to operate in first and second safe modes in which flight planning commands are accepted but manual commands are refused, first and second manual modes in which flight planning commands are refused but manual commands are accepted, and an enroute mode and first and second special modes in which flight planning and manual commands are refused. The computer is further configured to only allow mode transitions between the first safe and manual modes, the second safe and manual modes, the first and second safe modes and the second safe and enroute modes.

In accordance with embodiments or, as an alternative, the airframe is manned, unmanned, or manned but un-crewed.

In accordance with embodiments or, as an alternative, the flight planning commands include flight plan details and waypoint settings and the manual commands include local maneuvering commands.

In accordance with embodiments or, as an alternative, the first safe mode includes a ground stationary mode characterized in that the airframe is grounded, the first manual mode includes a ground manual mode characterized in that the airframe is taxiing, the second safe mode includes a hover stationary mode characterized in that the airframe is in a stable hover and the second manual mode includes a hover manual mode characterized in that the airframe is in a maneuverable hover.

In accordance with embodiments or, as an alternative, the computer executes the flight planning commands during the enroute mode.

In accordance with embodiments or, as an alternative, the first and second special modes include take-off and landing modes and are achieved by transitioning between the first and second safe modes.

In accordance with embodiments or, as an alternative, the computer is receptive of a stop command, which initiates a transition from the first manual mode to the first safe mode, from the second manual mode to the second safe mode and from the enroute mode to the second safe mode.

According to yet another aspect of the invention, a system is provided and includes a first computer by which flight planning and manual commands are generated and the aircraft, wherein the computer comprises a second flight computer. The first computer is configured to prevent generation of the manual commands with the drive elements operating in the first and second safe modes, the enroute mode and the first and second special modes and to prevent generation of the flight commands with the drive elements operating in the first and second manual modes, the enroute mode and the first and second special modes. The second computer is configured to only allow mode transitions between the first safe and manual modes, the second safe and manual modes, the first and second safe modes and the second safe and enroute modes.

In accordance with embodiments or, as an alternative, the first computer is ground-based.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Unmanned vehicles and aircraft are capable of executing various types of missions or flight plans in the case of unmanned aircraft. Generally, systems for controlling unmanned aircraft have ground, hover or loiter and enroute modes but lack "safe" lockout modes and do not prevent transitions, such as take-off and landing operations, when the aircraft is in a non-stable state. Thus, since the unmanned aircraft has no stable states, movement commands could be given to the aircraft at all times and can lead to failures such as poorly executed flight plans or crashes. As will be described below, however, a control mode is provided that creates such "safe" modes and allows for the segregation of flight planning or mission commands and manual commands.

Figure 1:
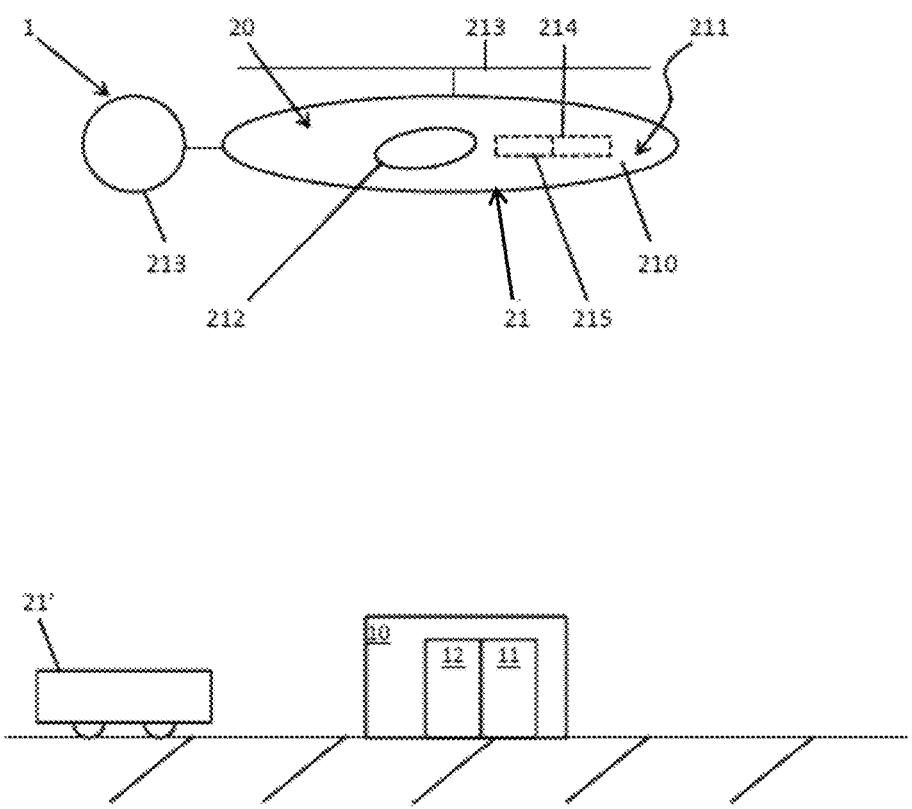
FIG. 1 is a schematic illustration of a system in accordance with embodiments.

With reference to FIG. 1, a system 1 is provided and includes control elements 10 and controlled elements 20. The control elements 10 can be grounded or airborne and include command and control devices 11, which are operable by operators, and a first computer 12. The operators input various commands into the first computer 12 by way of the command and control devices 11, which can be grounded or airborne, and in turn the first computer 12 responsively generates flight planning or mission commands and manual commands.

The controlled elements 20 include, for example, a vehicle such as an aircraft 21 or a ground vehicle 21' (e.g., an unmanned ground vehicle or UGV). The aircraft 21 may be provided as an unmanned aircraft element that is capable of executing a flight plan and additional operations during the flight plan (i.e., photography, payload drops, etc.). The aircraft 21 includes an airframe 210 (or a frame in the case of the ground vehicle 21'), an interior 211, on-board systems (i.e. sensors, payloads, recorders, other processors) 215, and aerodynamic elements 212, such as rotors, wings and/or flaps. The aircraft 21 further includes drive elements 213, which are configured to drive movements of the airframe 210, and a second computer 214. The ground vehicle 21' may have a similar structure but modified for ground operations and may include similar components. For purposes of clarity and brevity the following discussion will relate to the aircraft 21 case generally but it will be understood that the description is applicable to the ground vehicle 21' case as well.

The second computer 214 may be supported on the airframe 210 and/or disposed at least partially within the interior 211. The second computer 214 is configured to receive the flight planning or mission commands and the manual commands from the first computer 12 and to control operations of the drive elements 213, aerodynamic elements 212 and/or the on-board systems 215.

As described herein, the airframe 210 is formed to support manned, unmanned, or manned but un-crewed operations and, accordingly, the fuselage may not be designed to support operator occupancy. However, it is to be understood that embodiments exist for the manned or manned but un-crewed cases in which the airframe 210 is formed to define a cabin in which an operator, passenger or pilot can be stationed and it is to be further understood that this description is applicable to such cases.

Figure 2:
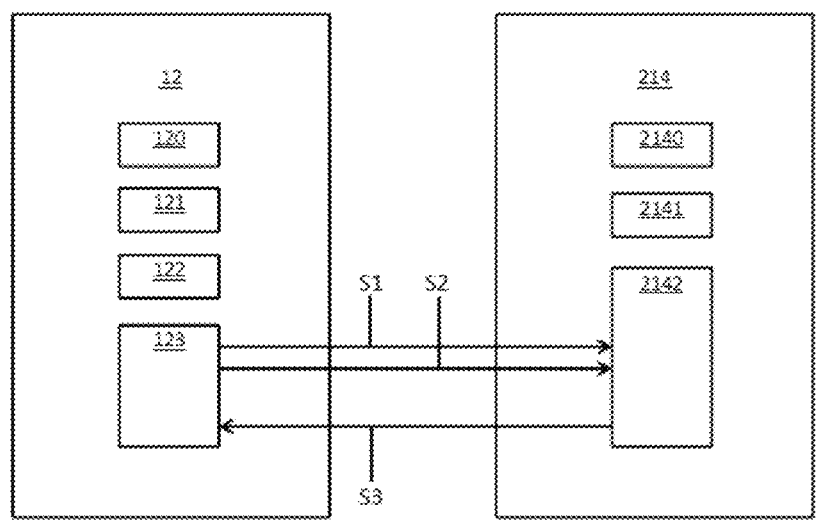
FIG. 2 is a schematic diagram of first and second computers of the system of FIG. 1.

With reference to FIG. 2, the first computer 12 includes a processing element 120 to which the command and control devices 11 are coupled, a display device 121, a memory element 122 and a transmitting/receiving element 123. The memory element 122 has executable instructions stored thereon, which, when executed, cause the display device 121 to display flight conditions and other relevant information to the operators, cause the processing element 120 to be receptive or not receptive of operator input, to generate from such input the flight planning or mission commands and the manual commands and to cause the transmitting/receiving element 123 to issue or to refuse to issue such flight planning or mission commands as first signals S1 and such manual commands as second signals S2. In addition, the executable instructions may further cause the processing element 120 to instruct the transmitting/receiving element 123 to receive or refuse data as third signals S3 from the second computer 214, which is descriptive of some flight conditions and the other relevant information.

The second computer 214 includes a processing element 2140 to which the controllable ones of the aerodynamic elements 212 (i.e., the flaps) and the drive elements 213 are coupled, a memory element 2141 and a transmitting/receiving element 2142. The memory element 2141 has executable instructions stored thereon, which, when executed, cause the processing element 2140 to instruct the transmitting/receiving element 2142 to receive or to refuse the first signals S1 and the second signals S2, to thereby generate local command and control commands by which the controllable ones of the aerodynamic elements 212 and the drive elements 213 can be controlled and to cause the transmitting/receiving element 2142 to issue the third signals S3 to the first computer 12.

Figure 3:
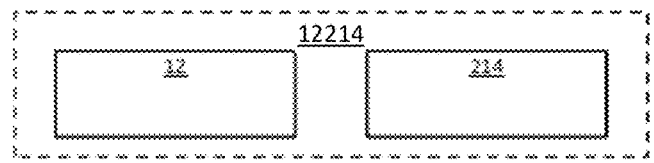
FIG. 3 is a schematic diagram illustrating that the first and second computers of FIGS. 1 and 2 can be components of a system computing system.
Figure 4:
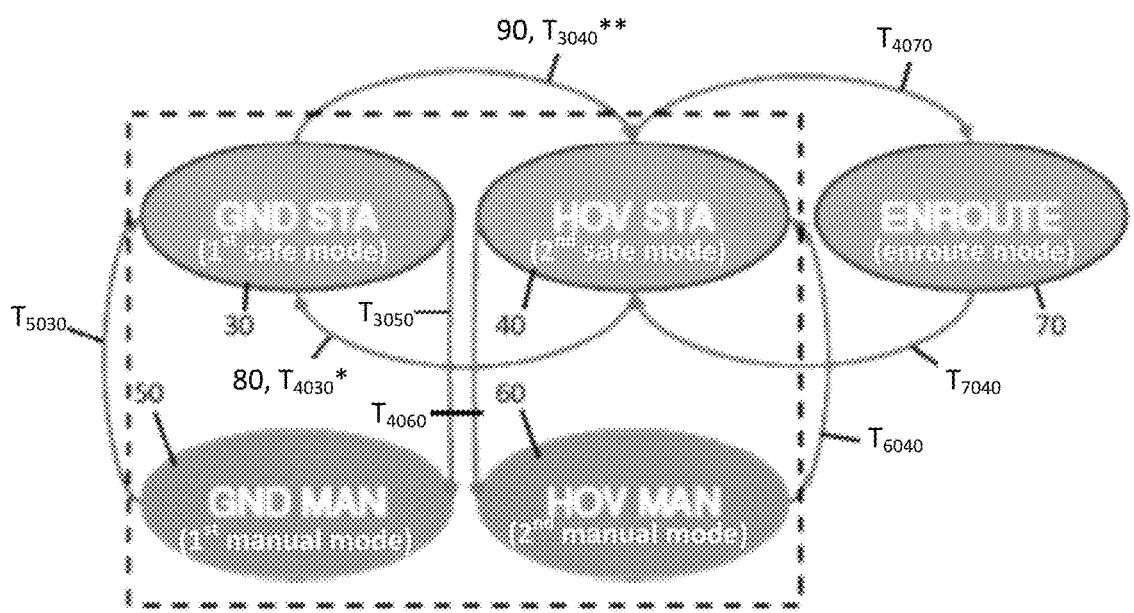
FIG. 4 is a flow diagram illustrating a method of operating an aircraft in various operating modes.

With reference to FIGS. 3 and 4 and with the first computer 12 and the second computer 214 of the system 1 configured as described above, the first computer 12 and the second computer 214 may be provided as components of a single computing system 12214. In this way, the first computer 12 and the second computer 214 operate in concert with one another. For example, the second computer 214 may control the controllable ones of the aerodynamic elements 212 and the drive elements 213 to operate in a given operational mode and the first computer 12 may refuse operator input in accordance with this operational mode. Thus, the first computer 12 and the second computer 214 may act alone or in concert to, for example, control operations of the controllable ones of the aerodynamic elements 212 and the drive elements 213 to operate as shown in FIG. 4. That is, the controllable ones of the aerodynamic elements 212 and the drive elements 213 may be controlled the first computer 12 and/or the second computer 214 to operate in a first safe mode 30, a second safe mode 40, a first manual mode 50, a second manual mode 60, an enroute mode 70, a first special mode 80 and a second special mode 90.

The first safe mode 30 may be referred to as a ground stationary mode, which is characterized in that the airframe 210 is grounded in a stable state. The first safe mode 30 is thus used primarily for flight planning, operating on-board elements, and no manual commands are accepted while the first safe mode 30 is in effect. More particularly, in the first safe mode 30, the flight planning or mission commands, such as data reflective of flight plan details and waypoint settings, are accepted by the second computer 214 from the first computer 12 via the transmitting/receiving elements 123 and 2142 but the manual commands, such as local maneuvering commands, are refused.

In addition and, in accordance with further embodiments, with the first safe mode 30 in effect, the first computer 12 may be configured to accept operator input of the flight planning or mission commands and on-board elements and/or to signal to the operator that such operator input will be accepted. The signaling may be achieved by enabling or "green lighting" corresponding ones of the command and control devices 11. By contrast, with the first safe mode 30 in effect, the first computer 12 may be configured to refuse operator input of the manual commands and/or to signal to the operator that such operator input of the manual commands will be refused. The signaling may be achieved by disabling or "greying out" the corresponding ones of the command and control devices 11.

The second safe mode 40 may be referred to as a hover or loiter stationary mode (hereinafter referred to as a "loiter stationary mode"), which is characterized in that the airframe 210 is in a stable loiter. The second safe mode 40 is thus used primarily for flight planning, operating on-board elements, and again no manual commands are accepted while the second safe mode 40 is in effect. More particularly, in the second safe mode 40, the flight planning or mission commands, such as data reflective of flight plan details and waypoint settings, are accepted by the second computer 214 from the first computer 12 via the transmitting/receiving elements 123 and 2142 but the manual commands, such as local maneuvering commands, are refused.

In addition and, in accordance with further embodiments, with the second safe mode 40 in effect, the first computer 12 may be configured to accept operator input of the flight planning or mission commands and on-board elements and/or to signal to the operator that such operator input will be accepted. The signaling may be achieved by enabling or "green lighting" corresponding ones of the command and control devices 11. By contrast, with the second safe mode 40 in effect, the first computer 12 may be configured to refuse operator input of the manual commands and/or to signal to the operator that such operator input of the manual commands will be refused. The signaling may be achieved by disabling or "greying out" the corresponding ones of the command and control devices 11.

The first manual mode 50 may be referred to as a ground manual mode, which is characterized in that the airframe 210 is grounded and subject to manual control. The first manual mode 50 is thus used primarily for taxiing purposes operating on-board elements, and while manual commands are accepted while the first manual mode 50 is in effect, the flight planning or mission commands are refused. More particularly, in the first manual mode 50, the manual commands, such as local maneuvering or taxiing commands, are accepted by the second computer 214 from the first computer 12 via the transmitting/receiving elements 123 and 2142 but the flight planning or mission commands are refused.

In addition and, in accordance with further embodiments, with the first manual mode 50 in effect, the first computer 12 may be configured to accept operator input of the manual commands and on-board elements and/or to signal to the operator that such operator input will be accepted. The signaling may be achieved by enabling or "green lighting" corresponding ones of the command and control devices 11. By contrast, with the first manual mode 50 in effect, the first computer 12 may be configured to refuse operator input of the flight planning or mission commands and/or to signal to the operator that such operator input of the flight planning or mission commands will be refused. The signaling may be achieved by disabling or "greying out" the corresponding ones of the command and control devices 11.

The second manual mode 60 may be referred to as a hover or loiter manual mode (hereinafter referred to as a "loiter manual mode"), which is characterized in that the airframe 210 is loitering and subject to manual control. The second manual mode 60 is thus used primarily for local maneuvering purposes, operating on-board elements, and while manual commands are accepted while the second manual mode 60 is in effect, the flight planning or mission commands are refused. More particularly, in the second manual mode 60, the manual commands, such as local maneuvering commands, are accepted by the second computer 214 from the first computer 12 via the transmitting/receiving elements 123 and 2142 but the flight planning or mission commands are refused.

In addition and, in accordance with further embodiments, with the second manual mode 60 in effect, the first computer 12 may be configured to accept operator input of the manual commands and on-board elements and/or to signal to the operator that such operator input will be accepted. The signaling may be achieved by enabling or "green lighting" corresponding ones of the command and control devices 11. By contrast, with the second manual mode 60 in effect, the first computer 12 may be configured to refuse operator input of the flight planning or mission commands and/or to signal to the operator that such operator input of the flight planning or mission commands will be refused. The signaling may be achieved by disabling or "greying out" the corresponding ones of the command and control devices 11.

The enroute mode 70 is characterized in that during this mode the second computer 214 controls the controllable ones of the aerodynamic elements 212, the drive elements 213, and the on-board system elements to execute the uploaded flight planning or mission commands. The first special mode 80 refers to a landing mode and is placed into effect by a mode transition $T_{4030}$ from the second safe mode 40 to the first safe mode 30. The second special mode 90 refers to a take-off mode and is placed into effect by a mode transition $T_{3040}$ from the first safe mode 30 to the second safe mode 40. The first computer 12 may be configured to prevent generation of the manual commands and the flight planning or mission commands with the controllable ones of the aerodynamic elements 212 and the drive elements 213 operating in the enroute mode 70, the first special mode 80 and the second special mode 90. That is, with the enroute mode 70, the first special mode 80 or the second special mode 90 in effect, the first computer 12 may be configured to refuse operator input of the flight planning or mission commands and the manual commands and/or to signal to the operator that such operator input of the flight planning or mission commands and the manual commands will be refused. The signaling may be achieved by disabling or "greying out" the corresponding ones of the command and control devices 11.

Still referring to FIG. 4, the second computer 214 may be further configured to only allow a mode transition $T_{3050}$ from the first safe mode 30 to the first manual mode 50, a mode transition $T_{5030}$ from the first manual mode 50 to the first safe mode 30, a mode transition $T_{4060}$ from the second safe mode 40 to the second manual mode 60, a mode transition $T_{6040}$ from the second manual mode 60 to the second safe mode 40, the mode transition $T_{3040}$ from the first safe mode 30 to the second safe mode 40, the mode transition $T_{4030}$ from the second safe mode 40 to the first safe mode 30, a mode transition $T_{4070}$ from the second safe mode 40 to the enroute mode 70 and a mode transition $T_{7040}$ from the enroute mode 70 to the second safe mode 40.

In accordance with further embodiments, the second computer 214 may be receptive of a stop command from the first computer 12 via the transmitting/receiving elements 123 and 2142. The stop command may initiate the mode transition $T_{5030}$ from the first manual mode 50 to the first safe mode 30, the mode transition $T_{6040}$ from the second manual mode 60 to the second safe mode 40 and the mode transition $T_{7040}$ from the enroute mode 70 to the second safe mode 40.

In the case of the vehicle being the ground vehicle 21', the second safe mode 40 and the second manual mode 60 could be discarded and all enroute transitions would be replaced with the T3070 and T7030 transitions with the first safe mode 30. Similarly, the first and second special modes 80 and 90 could be discarded along with their respective transitions.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An aircraft, comprising:
   an airframe;
   drive elements configured to drive movements of the airframe; and
   a computer, including at least one processor, configured to receive flight planning and manual commands and to control operations of the drive elements to operate in:
   first and second safe modes in which the flight planning commands are accepted but the manual commands are refused,
   first and second manual modes in which the flight planning commands are refused but the manual commands are accepted, and
   an enroute mode and first and second special modes in which the manual commands are refused,
   the computer being further configured to only allow mode transitions directly between the first safe mode and the first manual mode, directly between the second safe mode and the second manual mode, directly between the first safe mode and the second safe mode and directly between the second safe mode and the enroute mode.

2. The aircraft according to claim 1, wherein the airframe is manned and crewed or un-crewed or unmanned.

3. The aircraft according to claim 1, wherein the flight planning commands comprise at least one of flight plan details, mission details, on-board system details, and waypoint settings and the manual commands comprise local maneuvering commands.

4. The aircraft according to claim 1, wherein the first safe mode comprises a ground stationary mode characterized in that the airframe is grounded, the first manual mode comprises a ground manual mode characterized in that the airframe is taxiing, the second safe mode comprises a loiter stationary mode characterized in that the airframe is in a stable loiter and the second manual mode comprises a loiter manual mode characterized in that the airframe is in a maneuverable loiter.

5. The aircraft according to claim 4, wherein the computer executes the flight planning commands during the enroute mode.

6. The aircraft according to claim 4, wherein the first and second special modes comprise take-off and landing modes and are achieved by transitioning between the first and second safe modes.

7. The aircraft according to claim 1, wherein the computer is receptive of a stop command, which initiates a transition from the first manual mode to the first safe mode, from the second manual mode to the second safe mode and from the enroute mode to the second safe mode.

8. An aircraft, comprising:
   an airframe;
   drive elements configured to drive movements of the airframe; and
   a computer, including at least one processor, configured to receive flight planning commands and manual commands and to control operations of the drive elements to operate in:
   first and second stationary modes which are characterized in that the airframe is stationary relative to ground and in which the flight planning commands are accepted but the manual commands are refused,
   first and second movable modes which are characterized in that the airframe is movable relative to the ground and in which the flight planning commands are refused but the manual commands are accepted, and
   an enroute mode and first and second special modes in which the manual commands are refused,
   the computer being further configured to only allow mode transitions directly between a first safe mode and a first manual mode, directly between a second safe mode and a second manual mode, directly between the first safe mode and the second safe mode and directly between the second safe mode and the enroute mode.

9. The aircraft according to claim 8, wherein the flight planning commands comprise at least one of mission details, on-board system details or waypoint settings and the manual commands comprise local maneuvering commands.

* * * * *